(12) United States Patent
Nishizawa

(10) Patent No.: US 7,916,372 B2
(45) Date of Patent: Mar. 29, 2011

(54) MOVABLE BODY APPARATUS AND OPTICAL DEFLECTOR USING THE MOVABLE BODY APPARATUS

(75) Inventor: Hideta Nishizawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 12/416,849

(22) Filed: Apr. 1, 2009

(65) Prior Publication Data

US 2009/0251756 A1 Oct. 8, 2009

(30) Foreign Application Priority Data

Apr. 3, 2008 (JP) .................................. 2008-097394
Mar. 4, 2009 (JP) .................................. 2009-050013

(51) Int. Cl.
*G02B 26/08* (2006.01)

(52) U.S. Cl. ................ 359/199.1; 359/213.1; 359/214.1

(58) Field of Classification Search ..... 359/198.1–200.8
See application file for complete search history.

(56) References Cited

FOREIGN PATENT DOCUMENTS

JP 8-44184 2/1996

*Primary Examiner* — James Phan
(74) *Attorney, Agent, or Firm* — Canon USA Inc IP Div

(57) ABSTRACT

A movable body apparatus includes a vibratory system, a vibration detecting portion, a driving portion, and a controlling portion. The vibratory system has a resonance frequency and a movable body capable of being reciprocally and rotatably vibrated. The vibration detecting portion detects a vibration condition of the movable body. The driving portion drives the vibratory system with a drive signal. The controlling portion regulates the drive signal supplied to the driving portion. The controlling portion regulates a driving frequency of the drive signal so that a delay phase difference between the drive phase of the drive signal and the vibration phase of the vibratory system obtained from detection result of the vibration detecting portion, both obtained when the vibratory system is vibrated at a predetermined frequency, is maintained.

10 Claims, 22 Drawing Sheets

CENTER OF SCAN

CENTER OF SCAN $\Delta\omega = 0$
$\omega_o2 = 2 \times \omega_o1$

MOVABLE BODY APPARATUS AND OPTICAL DEFLECTOR USING THE MOVABLE BODY APPARATUS

BACKGROUND OF THE INVENTION

1. Field of the Invention

The present invention relates to techniques of a movable body apparatus including at least a movable body which is reciprocally and rotatably supported. More particularly, the present invention relates to a movable body apparatus, such as a resonance-type movable body apparatus, and an optical deflector using this. This optical deflector can be preferably used in optical instruments, such as image forming apparatuses like a scanning-type display, a laser beam printer and a digital copying machine.

2. Description of the Related Art

In recent years, an optical deflector for deflecting and scanning a light beam is used in optical disc apparatuses, laser beam printers and the like. Further, there have been proposed optical deflectors with a minute mirror produced using micromachining techniques and capable of vibration in a resonance manner.

Such a resonance-type optical deflector has advantages as follows. Compared with an optical deflector using a rotary polygonal mirror, the size can be greatly reduced. The consumption electrical power also can be reduced. There theoretically exists no problem of so-called face tangle of a reflecting surface. In particular, with such an optical deflector formed of a Si single crystal capable of being fabricated by a semiconductor processing method, no metal fatigue exists theoretically, and the endurance property is typically excellent.

However, in resonance-type optical deflectors, the deflection angle (angular displacement) of a mirror changes in a sine-wave fashion. Accordingly, the angular velocity of the mirror varies. Japanese Patent Application Laid-Open No. 2005-208578 A (first Japanese reference, corresponding to U.S. Pat. Nos. 7,271,943 and 7,388,702, and US2008204843) discloses a method for correcting such property of a varying angular velocity. The deflection angle of a mirror has a predetermined relationship with the scan angle of a light beam deflected by the mirror, and hence these angles can be equivalently used. In this specification, the deflection angle (angular displacement) and the scan angle are used as a term having the same meaning.

The first Japanese reference discloses a micro-movable body apparatus in which a vibratory system with plural torsion springs and plural movable bodies has plural discrete characteristic vibratory modes. In this micro-movable body apparatus, plural discrete characteristic vibratory modes include a fundamental vibratory mode with a fundamental frequency and an even number-fold vibratory mode with a frequency equal to an approximately even number-fold of the fundamental frequency.

In this micro-movable body apparatus, a saw-tooth wave drive with an approximately equi-angular velocity range is achieved by vibrating the micro-movable body in those vibratory modes. The saw-tooth wave drive is illustrated in FIG. 22. In this drive, an angular displacement time of one way in a round trip motion of the movable body differs from that of the other way in the round trip motion within each period of the angular displacement. When the light beam deflected by the minute mirror under vibration of the saw-tooth wave drive is corrected by a correcting system or the like, approximately equi-velocity of a light spot formed on a scan surface can be attained without any change in the diameter of the light spot.

Meanwhile, the resonance-type optical deflector has the property that the resonance frequency changes due to a change in the ambient condition such as temperature. Japanese Patent Application Laid-Open No. 1995 (Heisei 7)-181415 A (second Japanese reference) discloses techniques of self-excited vibration as follows. An output signal of a detector for detecting the vibration of a movable body is fed back to a vibration input portion to control the driving frequency of the movable body. Thus, the movable body is always vibrated at its resonance frequency in response to a change in temperature.

When techniques of the second Japanese reference are applied to a system of plural torsion springs and plural movable bodies as disclosed in the first Japanese reference, the following disadvantage occurs. In techniques of the second Japanese reference, a delay phase difference between a target drive signal and the vibration of the torsion spring has a fixed value. In a case where plural factors exist for the phase delay between the drive signal and the vibration of the torsion spring, it is not easy to obtain an accurate delay phase difference.

Further, in techniques of the second Japanese reference, driving is performed in a single vibratory mode (bending deformation mode or torsional deformation mode). Therefore, when the driving of plural torsion springs is performed at a resonance frequency in the same kinds of plural vibratory modes about a common axis, the following disadvantage occurs.

For example, a vibratory system 200 as illustrated in FIG. 2 includes movable bodies 201 and 202, a torsion spring 211 for coupling these movable bodies, and a torsion spring 212 for coupling the movable body 202 to a support portion 221. In order that the movable body is driven as illustrated in FIG. 22, the driving needs to be performed by a combined wave of a fundamental driving wave in a fundamental vibratory mode at a frequency near a resonance frequency and an integer-fold driving wave at a double frequency, as illustrated in FIG. 19. When two movable bodies are driven by the combined wave having two frequency components in the same kinds of vibratory modes, it is not easy to control two frequency components of the angular displacement unless phases of frequency components of the drive signal are controlled.

Furthermore, in techniques of the second Japanese reference, it is not easy to drive the movable body at a frequency intentionally deviated from the resonance frequency.

SUMMARY OF THE INVENTION

According to one aspect, the present invention provides a movable body apparatus which includes a vibratory system, a vibration detecting portion, a driving portion, and a controlling portion. The vibratory system has a resonance frequency and a movable body capable of being reciprocally and rotatably vibrated. The vibration detecting portion is configured to detect a vibration condition of the movable body. The driving portion is configured to drive the vibratory system with a drive signal. The controlling portion is configured to regulate the drive signal supplied to the driving portion.

The controlling portion stores, as a target delay phase difference, a delay phase difference between a drive phase of the drive signal and a vibration phase of the vibratory system obtained from a detection result of the vibration detecting portion, both the drive phase and the vibration phase being obtained at the time when the vibratory system is vibrated at a predetermined frequency. The controlling portion regulates a driving frequency of the drive signal so that the delay phase difference between the drive phase of the drive signal and the vibration phase of the vibratory system obtained from detection result of the vibration detecting portion, both measured during driving of the vibratory system, is caused to be approximately coincident with the target delay phase difference.

According to another aspect, the present invention provides an optical deflector which includes the above-described movable body apparatus, and a reflective mirror provided on the movable body to reflect and deflect a light beam from a light source. The vibration detecting portion includes a light receiving device arranged to detect the deflected light beam at a predetermined deflection angle, and the vibration condition of the movable body is detected based on a time interval of light beam detection by the light receiving device.

According to yet another aspect, the present invention provides an optical instrument which includes the above-described optical deflector, and an irradiation target object. The optical deflector deflects the light beam from the light source, and directs at least a portion of the light beam to the irradiation target object.

According to the present invention, in a vibratory system with plural movable bodies as well as a vibratory system with a single movable body, the driving frequency for achieving an efficient driving can be determined even if the resonance frequency changes due to a change in the ambient condition such as temperature.

Further features of the present invention will become apparent from the following description of exemplary embodiments with reference to the attached drawings.

DESCRIPTION OF THE EMBODIMENTS

Figure 1:
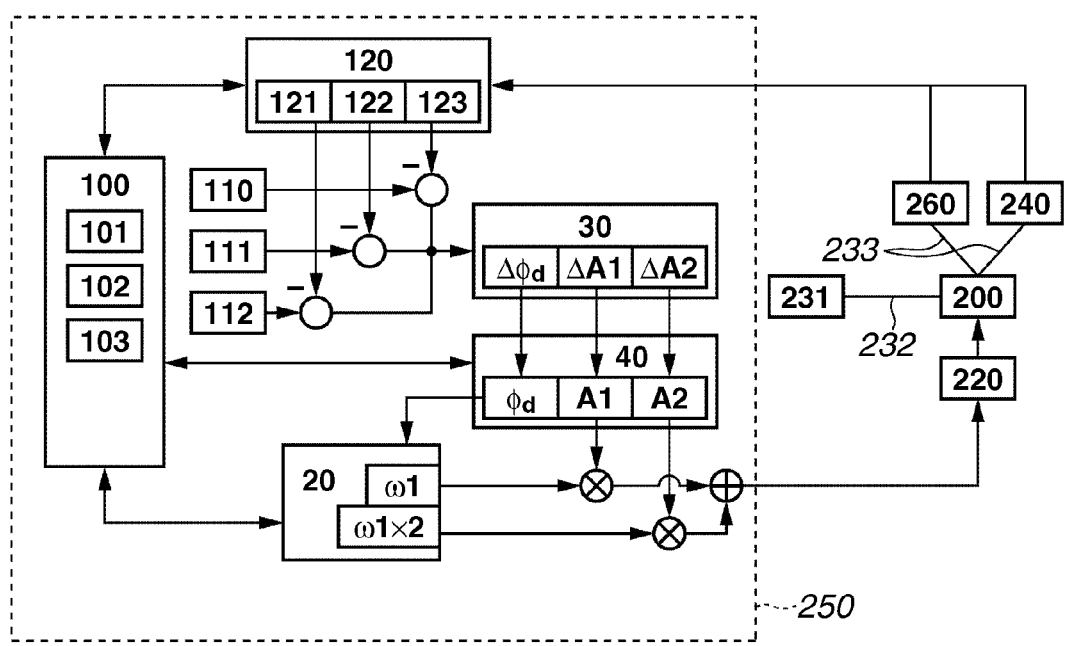
FIG. 1 is a block diagram illustrating the construction of an embodiment of an optical deflector using a movable body apparatus according to the present invention.

Embodiments of the present invention will hereinafter be described.

A fundamental embodiment of a movable body apparatus according to the present invention includes a vibratory system, a vibration detecting portion for detecting the vibration condition of a movable body in the vibratory system, a driving portion for driving the vibratory system by a drive signal, and a controlling portion for controlling or regulating the drive signal supplied to the driving portion. The vibratory system has a resonance frequency, and includes at least a movable body that is reciprocally and rotatably supported.

The controlling portion stores, as a target delay phase difference, the delay phase difference between a drive phase of the drive signal and a vibration phase of the vibratory system obtained through detection result by the vibration detecting portion, both obtained at the time when the vibratory system is vibrated at a predetermined frequency. Further, the controlling portion regulates a driving frequency of the drive signal so that the delay phase difference measured during driving is caused to be approximately coincident with the target delay phase difference.

When the vibratory system has a single movable body, the vibratory system has a single resonance frequency. The drive signal has a signal component with a frequency, and the vibration of the movable body has a single frequency component. Therefore, there is no need to regulate a phase difference between plural frequency components.

Thus, it is easy to acquire the delay phase difference between a single drive phase of the drive signal and the vibration phase of a single movable body obtained through the detection result by the vibration detecting portion. In this case, the delay phase difference at the time of vibration at a predetermined frequency is beforehand measured and stored as the target delay phase difference. A single driving frequency of the drive signal only needs to be regulated so that the delay phase difference measured during driving is caused to be approximately coincident with the target delay phase difference.

In a case where the vibratory system includes plural movable bodies, the vibratory system has plural resonance frequencies. The drive signal needs to have signal components with plural frequencies, and the vibration of the movable body has plural frequency components. Hence, there is a necessity that the controlling portion regulates a phase difference between plural frequency components of the drive signal so that a phase difference between plural frequency components involved in the vibration of the movable body reaches a predetermined value. Here, the controlling portion changes frequencies of plural signal components while maintaining an integer ratio between these frequencies.

The controlling portion also measures the relationship between frequencies of signal components of the drive signal corresponding to frequency components of the vibration of the movable body and amplitudes of the frequency components of the vibration, and determines plural driving frequencies based on the measurement result. Further, the controlling portion beforehand measures the delay phase difference (the delay phase difference between the drive phase of the signal component of the drive signal corresponding to any one of plural frequency components of the vibration of the movable body and the vibration phase thereof) at the time of vibration at a predetermined driving frequency, and stores it as the target delay phase difference. The controlling portion regulates plural driving frequencies of the drive signal so that the above delay phase difference measured during driving is caused to be approximately coincident with the target delay phase difference. In this specification, "approximately coincident" means acquisition of a phase difference closest to the target delay phase difference achieved by control of the driving portion with a possible frequency changing precision.

According to the above-described construction, in a vibratory system with plural movable bodies as well as a vibratory system with a single movable body, the driving frequency for achieving efficient driving can be determined even if the resonance frequency varies.

Figure 2:
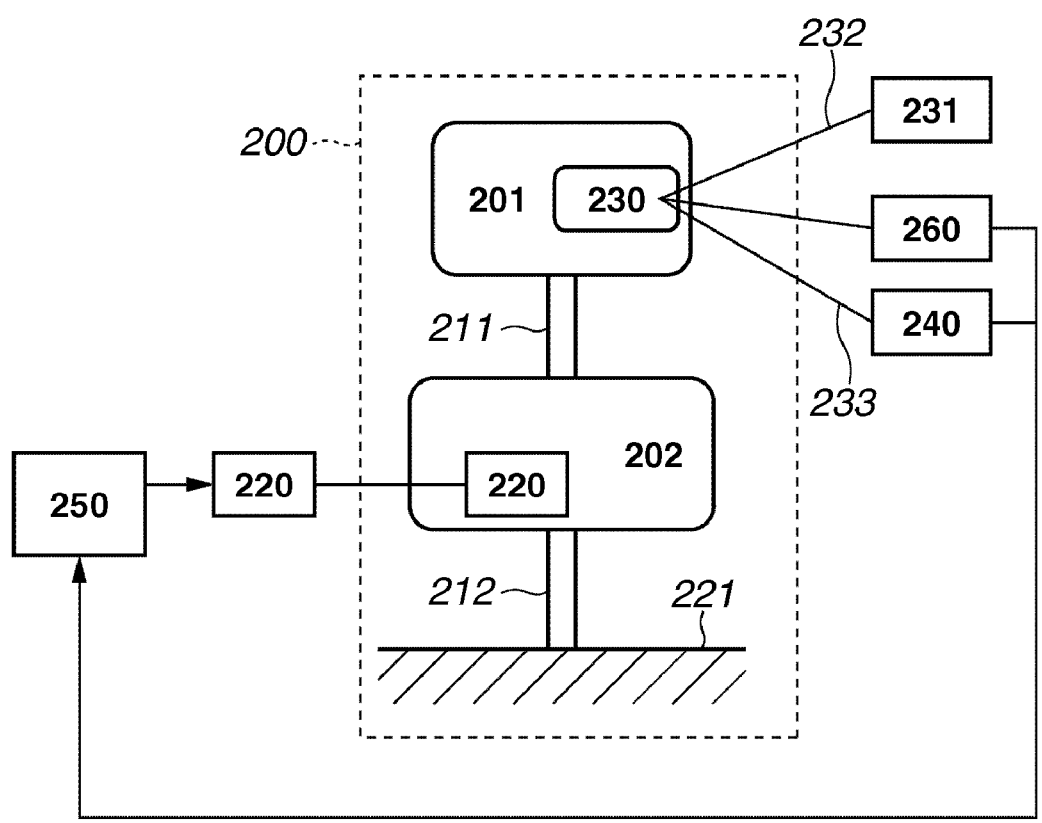
FIG. 2 is a view illustrating an optical deflector including two movable bodies.

A specific first exemplary embodiment will be described. FIG. 1 illustrates the construction of the first exemplary embodiment relating to an optical deflector using a movable body apparatus of the present invention. FIG. 2 illustrates the configuration of a vibratory system of the optical deflector.

As illustrated in FIG. 2, a vibratory system 200 includes first and second movable bodies 201 and 202 that are reciprocally and rotatably supported. The movable bodies 201 and 202 are serially coupled by a torsion spring 211, and the second movable body 202 is coupled to a support portion 221 by a torsion spring 212.

A driving portion 220 applies to the movable body a driving force for simultaneously exciting plural characteristic vibratory modes (here, plural vibratory modes of torsional deformation modes) by an electromagnetic, electrostatic, or piezoelectric method. For example, the electromagnetic driving portion is comprised of a coil and a permanent magnet. The movable body 201 has a reflective mirror 230 on its surface, and a light beam 232 from a light source 231 is reflected and deflected thereby. A scanning light beam 233 passes a vibration detecting portion or first and second light receiving devices 240 and 260 twice within a period. A controlling portion 250 generates drive signals supplied to the driving portion 220, by using times at which the scanning light beam 233 passes the light receiving devices 240 and 260.

Figure 3:
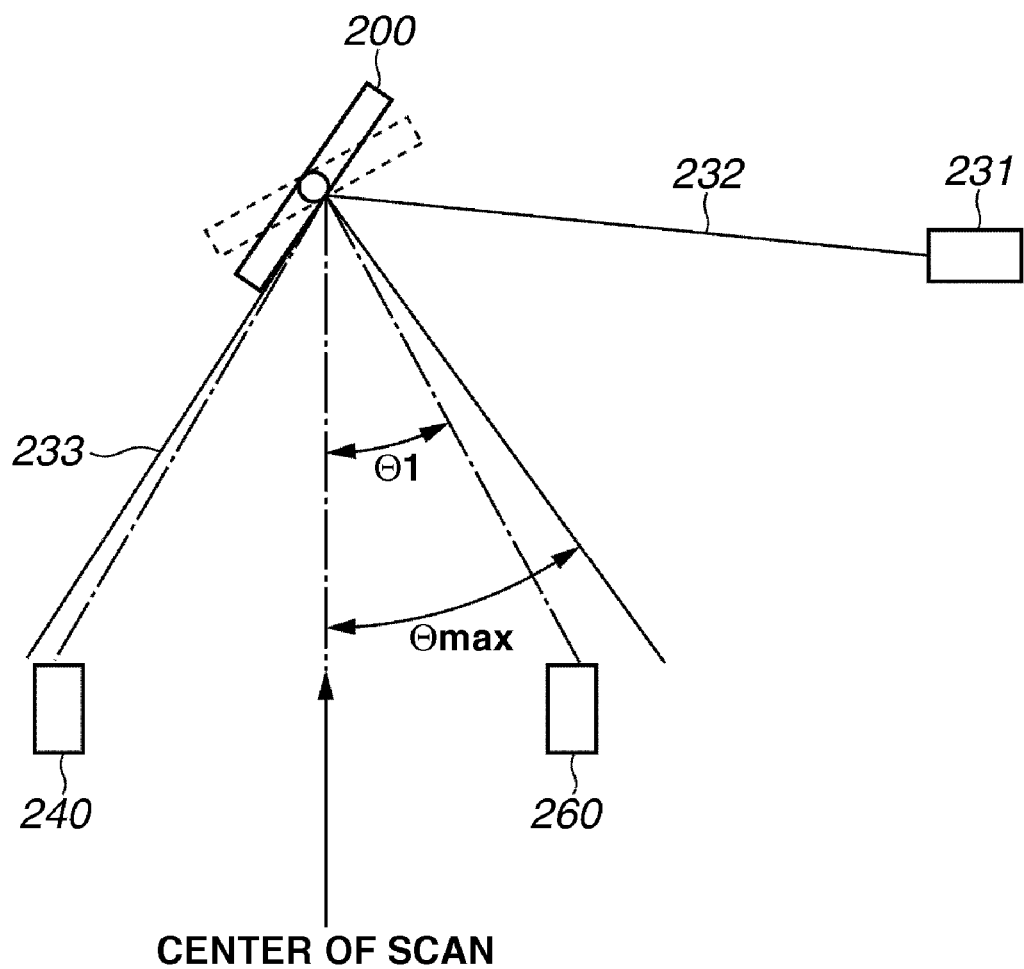
FIG. 3 is a view illustrating the deflection angle of an optical deflector.
Figure 19:
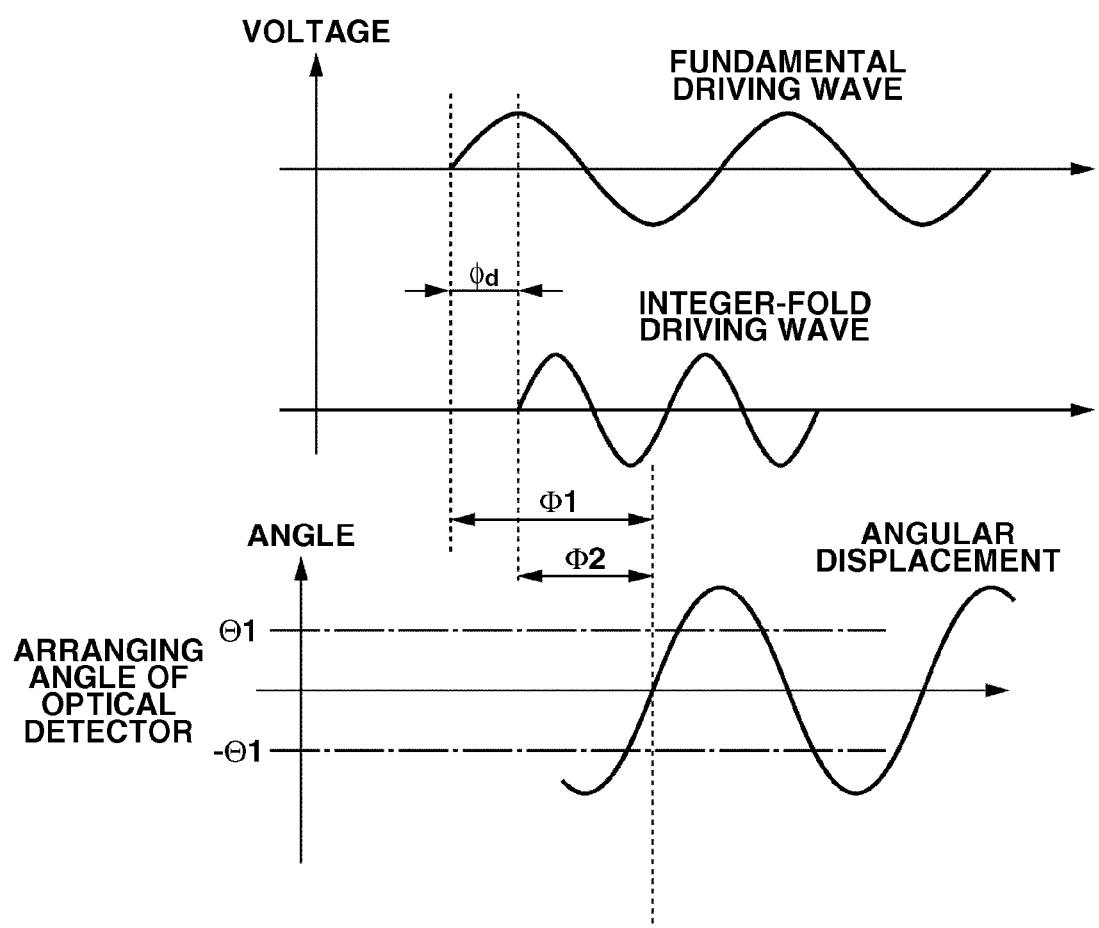
FIG. 19 is a graph showing the relationship between waveforms of components of drive signal and angular displacement.

The relationship between the scanning light beam 233 and the light receiving devices 240 and 260 will be described. FIG. 3 illustrates the deflection angle of the light beam deflected by the movable body 201 in the vibratory system 200. The movable body 201 in the vibratory system 200 is reciprocally and rotatably moved with the angular displacement (deflection angle) of $\theta$max. The first and second light receiving devices 240 and 260 are arranged at locations where the scanning light beam 233 deflected by an angle $\theta 1$ smaller than $\theta$max passes. When the maximum deflection angle $\theta$max of the scanning light beam 233 is sufficiently larger than $\theta 1$, the scanning light beam 233 passes each of the light receiving devices 240 and 260 twice within a period, as illustrated in FIG. 19.

Figure 4:
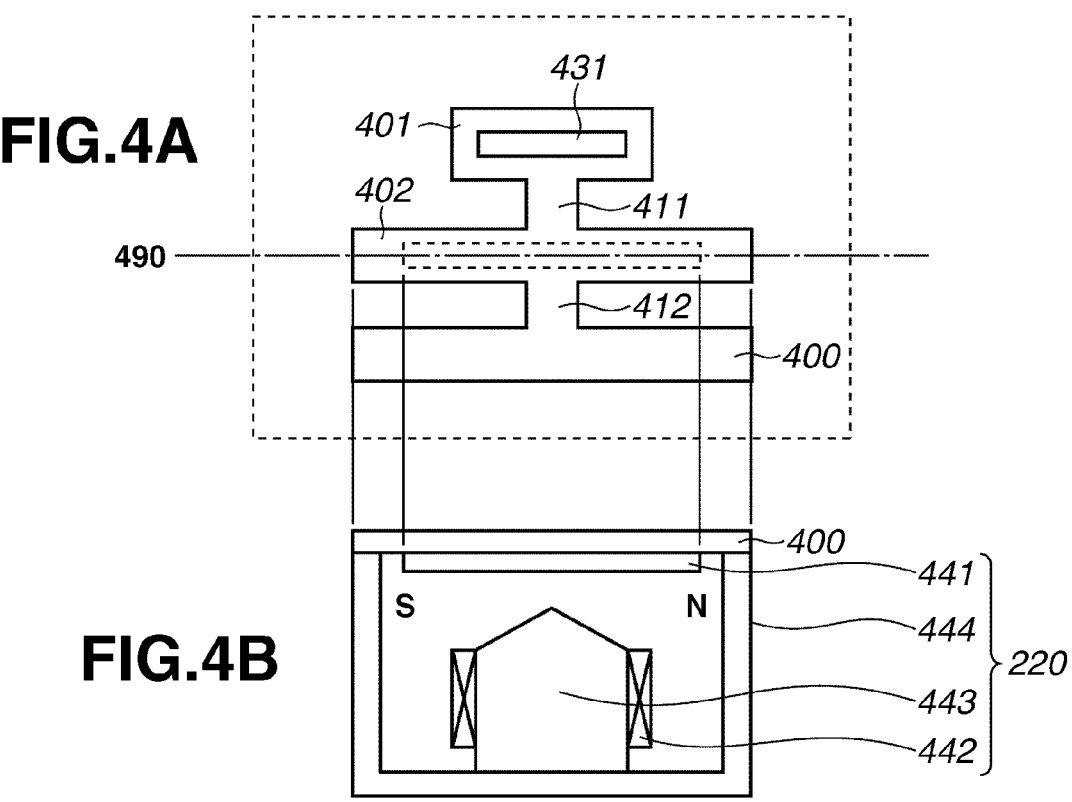
FIG. 4A is a plan view illustrating an example of a vibratory system in an optical deflector.
FIG. 4B is a cross-sectional view illustrating an example of a driving portion in the optical deflector.

FIG. 4 shows an example of a portion of the vibratory system 200 and the driving portion 220. FIG. 4A is a plan view of an optical deflector of the vibratory system. A plate member 400 is fabricated by etching a silicon wafer, for example. A planar movable body 401 is supported by a torsion spring 411. An optical reflective film 431 is deposited on an upper surface of the movable body 401. A movable body 402 supported by the torsion spring 411 is coupled to a support frame by a torsion spring 412. A system of the movable bodies 401 and 402, and the torsion springs 411 and 412 have two vibratory modes. The vibratory system 200 is constructed so that resonance frequencies of two vibratory modes include a fundamental resonance frequency and an approximately integer-fold (here approximately twice) frequency of the fundamental resonance frequency. That is, a ratio between the fundamental resonance frequency and integer-fold wave resonance frequency is an approximately integer ratio. In this specification, "approximately integer-fold" covers a range between 0.98n of the fundamental frequency and 1.02n of the fundamental frequency (n is an integer).

FIG. 4B is a schematic view showing the driving portion 220 for the optical deflector. FIG. 4B illustrates a cross section taken along a line 490. A magnet 441 is fixed on a lower surface of a movable body 402. The plate member 400 is fixed to a yoke 444 formed of a material having a large permeability. A core 443 formed of a material having a large permeability is arranged on a portion of the yoke 444 facing the permanent magnet 441. A coil 442 is wound around the core 443. The magnet 441, coil 442, core 443 and yoke 444 constitute the driving portion of an electromagnetic actuator. When a current flow is caused in the coil 442, a torque acts on the permanent magnet 441. Thus, the movable body 402 is driven.

An ordinary driving of the vibratory system 200 by the driving portion 220 is performed in the following manner.

The deflection angle θ of the optical deflector is represented by a formula (1) which is a function of time t.

$$\theta(t) = A1 \sin(\omega 1 t) + A2 \sin(\omega 2 t + \phi) \quad (1)$$

where A1 and ω1 are amplitude and angular frequency of a first vibratory motion in one vibratory mode, A2 and ω2 are amplitude and angular frequency of a second vibratory motion in the other vibratory mode, and φ is the relative phase difference between two frequency components.

FIG. 19 shows time waveforms of frequency components of the drive signal and the angular displacement (deflection angle). With respect to the drive signal, the phase difference between signal components of fundamental driving wave and integer-fold driving wave is set at φd so that φ is zero (i.e., φ=0) in the formula (1) of the angular displacement. In other words, the phase difference between plural frequency components involved in the vibration of the first movable body should be a predetermined value, and this is set at zero here.

The zero-crossing point of the angular displacement can be approximately calculated as an intermediate point between points of time at which the scanning light beam passes the first and second light receiving devices 240 and 260. However, in a case of φ≠0, since the zero-crossing point of each frequency component of the angular displacement differs from that of the combined wave thereof, the calculation becomes complicated and an accurate value cannot be readily acquired. Accordingly, the controlling portion 250 regulates the drive signal so that φ=0 is achieved, and the vibratory system 200 is thus driven.

When intervals of time between the zero-crossing point of each frequency signal component of the drive signal and the zero-crossing point of the angular displacement are represented in the term of each frequency, the delay phase difference between the drive phase of the drive signal and the vibration phase of the vibratory system can be obtained. As illustrated in FIG. 19, the delay phase difference between the drive phase of the fundamental driving wave and the vibration phase is φ1, and the delay phase difference between the drive phase of the integer-fold driving wave and the vibration phase is φ2.

The controlling portion 250 for supplying the drive signal to the driving portion 220 will be described with reference to FIG. 1.

In the construction of FIG. 1, a controller 100 in the controlling portion 250 sets the angular frequency ω1 of the first vibratory motion in a waveform generator 20. The waveform generator 20 outputs sine-waves with angular frequencies ω1 and 2×ω1. The phase difference φd between sine-waves with angular frequencies ω1 and 2×ω1 is calculated by a calculator 30, and the calculated result is supplied through an integrator 40. The two sine-waves thus generated are respectively multiplied by amplitudes A1 and A2 by a multiplier, and a combined wave generated through addition by an adder is supplied to the driving portion 220.

In this specification, the drive signal for generating the deflection angle θ of the optical deflector is represented using factors corresponding to A1, ω1, A2, ω2 and φ, and these factors are indicated by A1, ω1, A2, ω2 and φd. It will be apparent from the context that common signs A1, ω1, A2 and ω2 are relevant to the deflection angle θ or the drive signal.

Figure 5:
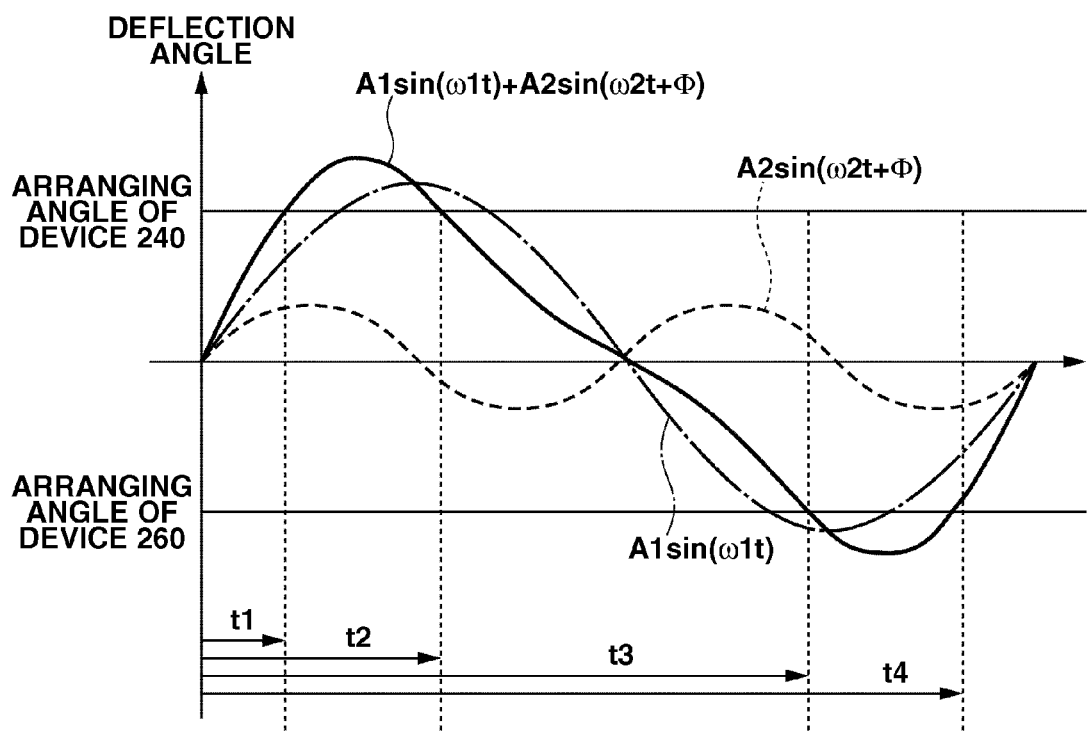
FIG. 5 is a graph illustrating a change with time in the deflection angle in an optical deflector.

As illustrated in FIG. 2, the drive signal in the form of the combined wave from the controlling portion 250 is supplied to the driving portion 220 to apply the driving force to the vibratory system 200. The movable body 201 is thus vibrated. The light beam 232 is deflected and scanned by the vibration of the movable body 201 with the mirror 230. The scanning light 233 is received by the light receiving devices 240 and 260. Reception times are t1, t2, t3 and t4, as illustrated in FIG. 5. The controlling portion 250 takes differences (intervals between times of detection of the light beam) from t1, t2, t3 and t4, and t2−t1, t3−t2 and t4−t3 are set in portions 121, 122 and 123 of a time measuring portion 120 acting as the vibration detecting portion, respectively. Differences between the calculated intervals of time set in portions 121, 122 and 123 and target times 110, 111 and 112 for achieving a desired angular displacement are acquired, and the calculator 30 converts these differences into operation amounts Δφd, ΔA1, ΔA2 of the drive signal.

An exemplary calculating method by the calculator 30 will be described. The following coefficients and matrix M are beforehand acquired. The coefficients represent changes in intervals t2−t1, t3−t1 and t4−t1 relevant to passing times of the scanning light beam 233 through the first and second light receiving devices 240 and 260, which occur when a control parameter X of A1, A2 or φd minutely changes from a target value. Those are represented by the following formulae (2) and (3).

$$\left.\frac{\partial t}{\partial X}\right|_{ti} - \left.\frac{\partial t}{\partial X}\right|_{t1}, (X = A1, A2, \phi_d), (i = 2, 3, 4) \quad (2)$$

$$M = \begin{bmatrix} \left.\frac{\partial t}{\partial A1}\right|_{t2} - \left.\frac{\partial t}{\partial A1}\right|_{t1} & \left.\frac{\partial t}{\partial A2}\right|_{t2} - \left.\frac{\partial t}{\partial A2}\right|_{t1} & \left.\frac{\partial t}{\partial \phi_d}\right|_{t2} - \left.\frac{\partial t}{\partial \phi_d}\right|_{t1} \\ \left.\frac{\partial t}{\partial A1}\right|_{t3} - \left.\frac{\partial t}{\partial A1}\right|_{t1} & \left.\frac{\partial t}{\partial A2}\right|_{t3} - \left.\frac{\partial t}{\partial A2}\right|_{t1} & \left.\frac{\partial t}{\partial \phi_d}\right|_{t3} - \left.\frac{\partial t}{\partial \phi_d}\right|_{t1} \\ \left.\frac{\partial t}{\partial A1}\right|_{t4} - \left.\frac{\partial t}{\partial A1}\right|_{t1} & \left.\frac{\partial t}{\partial A2}\right|_{t4} - \left.\frac{\partial t}{\partial A2}\right|_{t1} & \left.\frac{\partial t}{\partial \phi_d}\right|_{t4} - \left.\frac{\partial t}{\partial \phi_d}\right|_{t1} \end{bmatrix} \quad (3)$$

Accordingly, operation amounts ΔA1, ΔA2 and Δφd of amplitude and phase of each frequency component of the drive signal can be obtained from time differences Δt2, Δt3 and Δt4 between intervals t2−t1, t3−t1 and t4−t1 and target times t20−t10, t30−t10 and t40−t10, using the following formula (4). Thus, the controlling portion 250 generates the drive signal supplied to the driving portion 220.

$$\begin{bmatrix} \Delta A1 \\ \Delta A2 \\ \Delta \phi_d \end{bmatrix} = M^{-1} \begin{bmatrix} \Delta t2 \\ \Delta t3 \\ \Delta t4 \end{bmatrix} \quad (4)$$

The construction and function of the controlling portion 250 will be described. In the controller 100, a frequency for starting the drive is stored in a portion 101, and at a drive start time the drive starting frequency in the portion 101 is set in the waveform generator 20. The driving is thus started. Further, in the controller 100, delay phase differences are stored in a portion 102. The delay phase differences are differences between the drive phases of two signal components of the drive signal from the waveform generator 20 and the vibration phase of the angular displacement of the movable body 201 obtained from signals from the time measuring portion 120 (see FIG. 19).

Figure 6A:
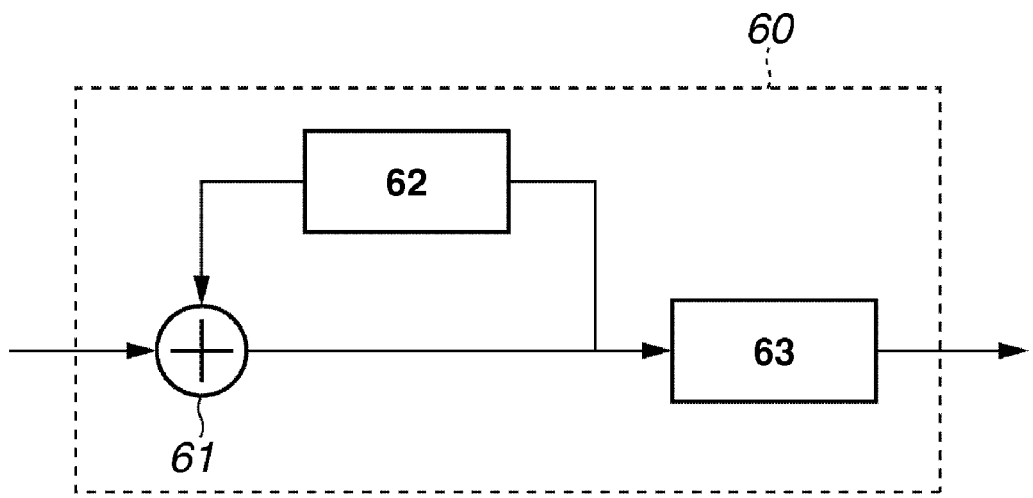
FIG. 6A is a block diagram illustrating the construction of an NCO acting as a waveform generator.
Figure 6B:
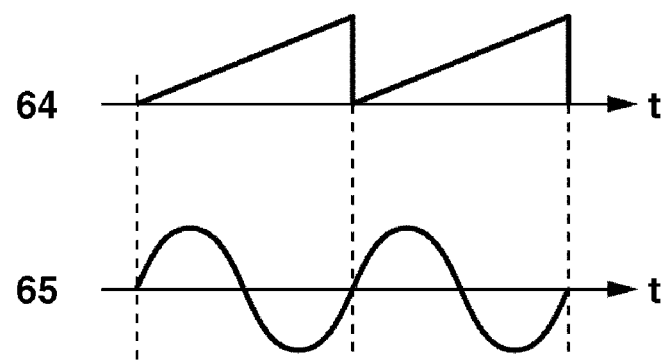
FIG. 6B is a graph showing output waveforms of the NCO illustrated in FIG. 6A.

The waveform generator 20 can be comprised of an NCO (Numerical-Controlled-Oscillator), for example. An example of an NCO 60 is illustrated in FIG. 6A. Addition of a digital input and a signal one sample prior thereto generated by a sampling delay device 62 is executed by an adder 61, and the added result is input into a sine-wave table 63 as an address. A digital sine-wave component is derived from the sine-wave table 63. In this construction, when a digital signal having a given level continues to be input, a signal with a given positive inclination according to the input level appears as an output of the adder 61, as illustrated in FIG. 6B. Provided that the digital input is reset to zero upon reaching a predetermined maximum value, it is possible to obtain a saw-tooth wave 64 with a period (frequency) according to the input level. Therefore, a sine-wave component 65 can be derived by inputting the saw-tooth wave 64 into the sine-wave table 63. The frequency of the sine-wave component 65 can be changed by changing the input level.

Figure 7A:
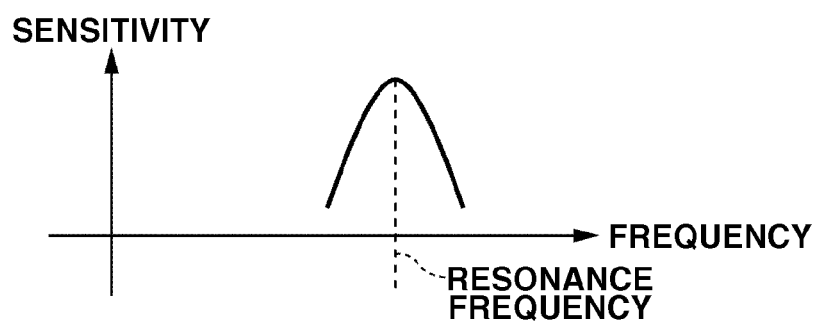
FIG. 7A is a graph showing the driving frequency-sensitivity characteristic.
Figure 7B:
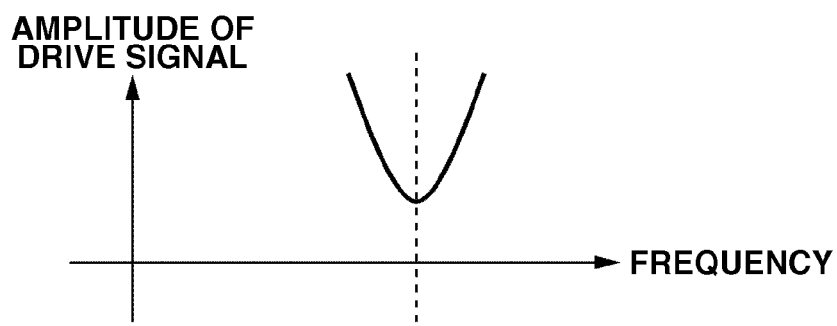
FIG. 7B is a graph showing the driving frequency-amplitude characteristic.
Figure 7C:
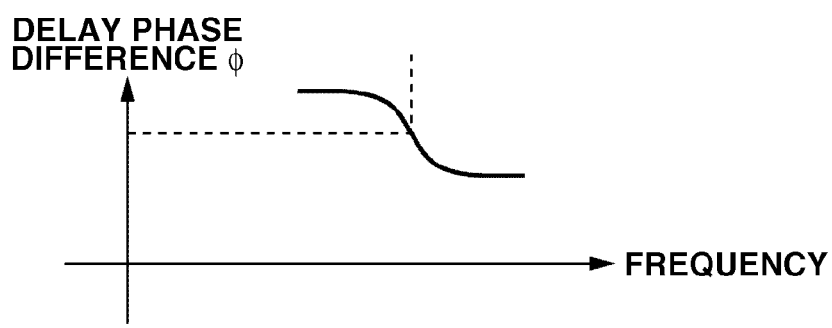
FIG. 7C is a graph showing driving the driving frequency-delay phase characteristic.

In the controlling portion 250, the following operation is also performed. FIG. 7A shows sensitivity near the resonance frequency of the movable body. FIG. 7B shows amplitude of the drive signal at the time of control. FIG. 7C shows frequency characteristic of the delay phase difference between the drive phase and the vibration phase. Here, the relationship between each signal component of the drive signal and the frequency component of the angular displacement corresponding thereto is illustrated. The sensitivity becomes maximum at the resonance frequency. Hence, in order that the target angular displacement is maintained by controlling, an intensity of the drive signal needs to be changed in accordance with the amount of deviation between the driving frequency and the resonance frequency.

The phase difference between the drive phase and the vibration phase decreases (i.e., the delay decreases) when the driving frequency is smaller than the resonance frequency, and increases (i.e., the delay increases) when the driving frequency is larger than the resonance frequency. Further, a changing rate of the delay phase difference is maximum at the resonance frequency.

Each resonance frequency can be detected as follows. The controlling portion 250 supplies the drive signal in the form of a single sine-wave to the driving portion 220 for driving the vibratory system 200 while sweeping the driving frequency of the drive signal near the resonance frequency, and measures the driving frequency-amplitude characteristic to detect the resonance frequency. Simultaneously, the controlling portion 250 detects the drive amplitude of the drive signal (in this case, the amplitude of the angular displacement is maintained at a constant value), or the amplitude of the vibration of the movable body (in this case, the drive amplitude is maintained at a constant value) to measure the driving frequency-amplitude characteristic. In the former case, the resonance frequency is a driving frequency at which the drive amplitude is minimum. In the latter case, the resonance frequency is a driving frequency at which the amplitude of the angular displacement is maximum.

Further, the resonance frequency can also be obtained based on attenuation of the vibration of the movable body occurring after the driving of the movable body is stopped. In this case, the resonance frequency can be measured from a counter electromotive force appearing in the driving coil, for example.

Figure 8A:
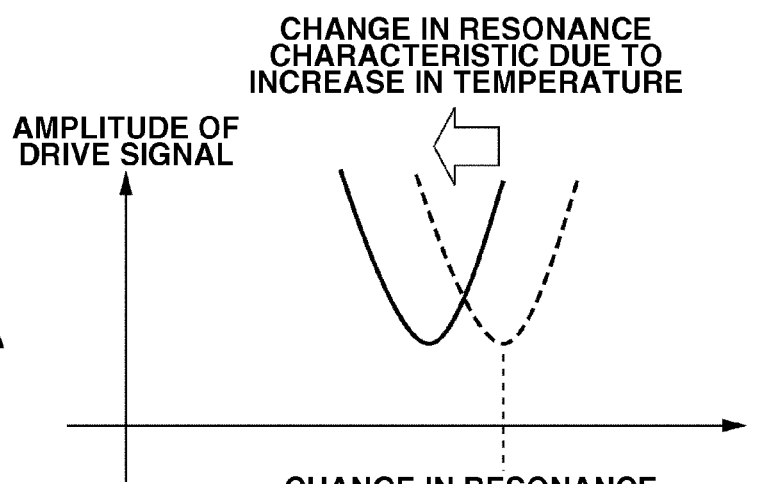
FIG. 8A is a graph showing a change in the driving frequency-amplitude characteristic due to a change in temperature.
Figure 8B:
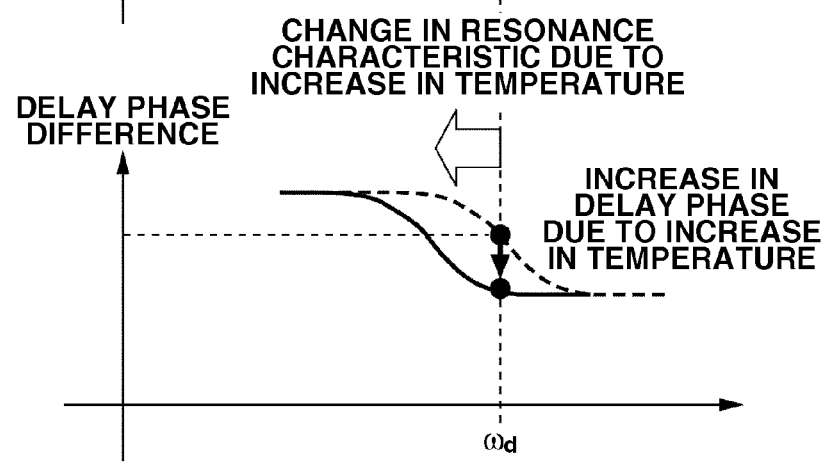
FIG. 8B is a graph showing a change in the driving frequency-delay phase characteristic due to a change in temperature.
Figure 9A:
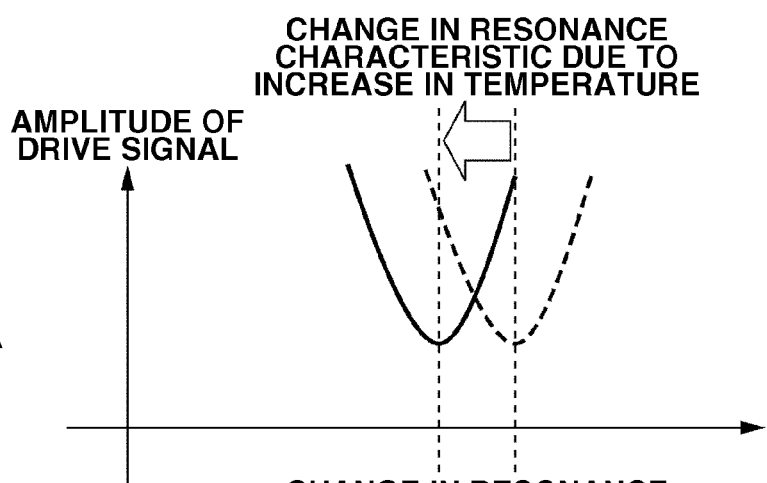
FIG. 9A is a graph showing a manner of changing the driving frequency in response to a change in resonance characteristic.
Figure 9B:
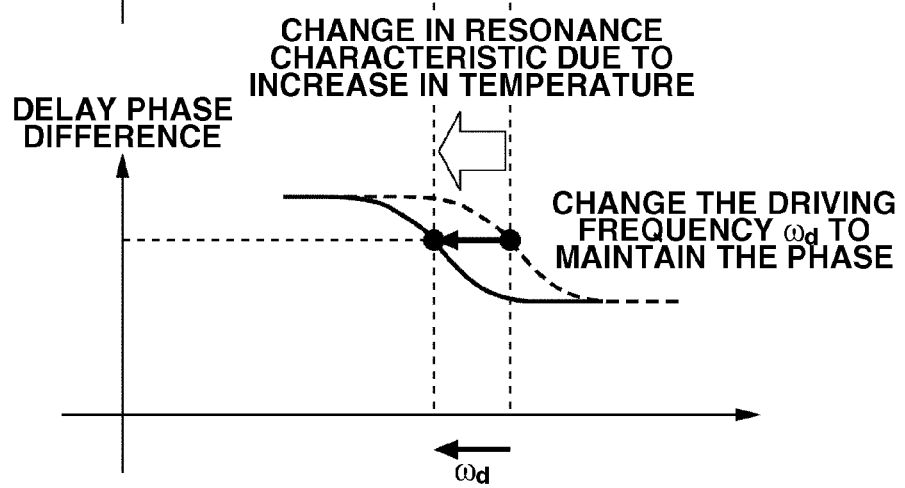
FIG. 9B is a graph showing a manner of changing the driving frequency in response to a change in resonance characteristic.

FIG. 8A shows a change in the driving frequency-amplitude characteristic at the time when temperature increases, FIG. 8B shows a change in the driving frequency-phase characteristic at the time when temperature increases. It can be seen therefrom that the resonance frequency of the movable body decreases as temperature increases. In a case where the driving is performed at the resonance frequency prior to a change in temperature, the amplitude of the drive signal and the delay phase difference between the drive phase and the vibration phase increase due to a change in temperature. In order that the driving is always performed at the resonance frequency irrespective of a change in temperature, the delay phase difference between the drive phase and the vibration phase should be maintained even when temperature changes, as illustrated in FIGS. 9A and 9B.

The operation for maintaining the delay phase difference will be described. In this operation, when the driving frequency is closer to the resonance frequency of the first vibratory mode, a precision of following the resonance frequency increases more when the target delay phase difference is set at the phase difference $\phi 1$ between the fundamental driving wave phase and the vibration phase (see FIG. 19) than when the target delay phase difference is set at the phase difference $\phi 2$ between the integer-fold driving wave phase and the vibration phase. Conversely, when the driving frequency is closer to the resonance frequency of the second vibratory mode, the following precision increases more when the target delay phase difference is set at $\phi 2$ than when the target delay phase difference is set at $\phi 1$.

Therefore, the delay phase difference is preferably the delay phase difference between the vibration phase of the movable body and the drive phase of a signal component out of the fundamental wave signal component and the integer-fold wave signal component, the frequency of which is closer to the resonance frequency than that of the other. This exemplary embodiment is constructed based on this principle.

As described above, the system of two vibrators as illustrated in FIG. 2 has two vibratory modes, and the ratio between resonance frequencies of the vibratory modes is regulated to be approximately 1:2. However, the ratio between resonance frequencies actually deviates from 1:2. Where the fundamental resonance frequency is $\omega_0 1$ and the integer-fold resonance frequency is $\omega_0 2$, a deviation difference $\Delta \omega$ is defined by equation (5).

$$\Delta \omega = \omega_0 2 - (2 \times \omega_0 1) \quad (5)$$

Figure 10A:
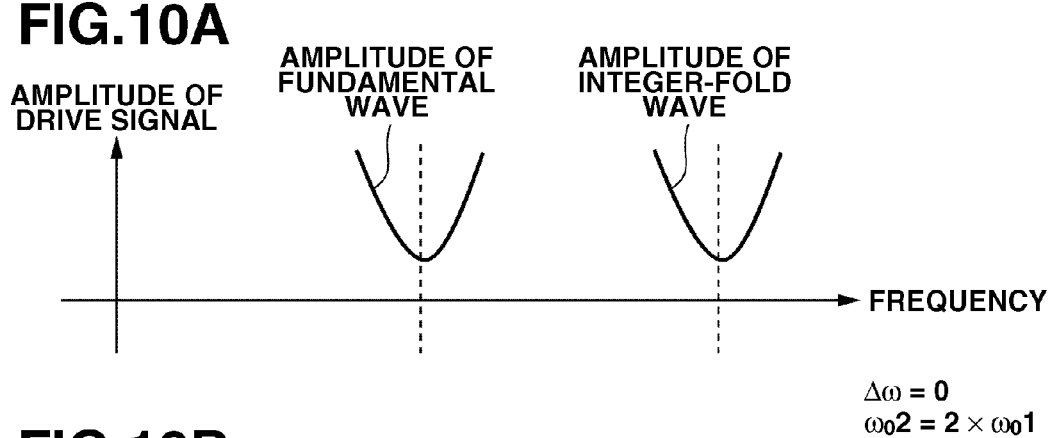
FIG. 10A is a graph showing the driving frequency-amplitude characteristic of a system with two movable bodies in a case of $\Delta\omega=0$.
Figure 10B:
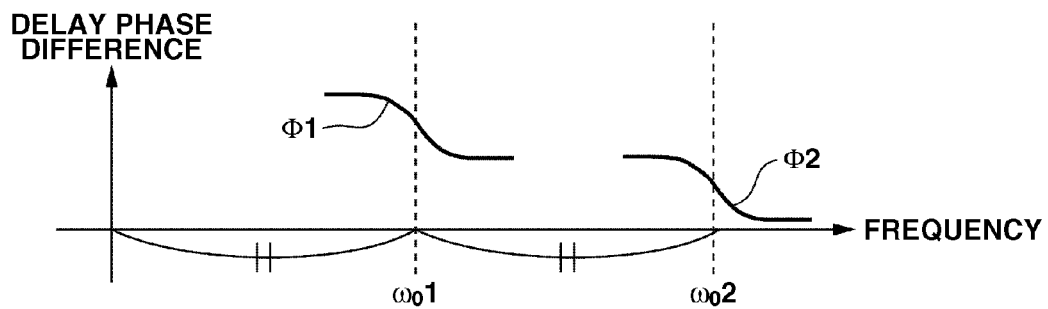
FIG. 10B is a graph showing the driving frequency-delay phase characteristic of the system with two movable bodies in a case of $\Delta\omega=0$.

FIGS. 10A and 10B respectively show the drive signal amplitude-frequency characteristic and the phase difference-frequency characteristic in a device with $\Delta \omega = 0$. Here, where the driving frequency of the fundamental wave component in the drive signal is $\omega_d 1$ and the driving frequency of the integer-fold wave component in the drive signal is $\omega_d 2$, the relationship of equation (6) is always maintained.

$$\omega_d 2 = 2 \times \omega_d 1 \quad (6)$$

Accordingly, the driving at the resonance frequencies can be attained by establishing the following equations (7-a) and (7-b).

$$\omega_d 1 = \omega_0 1 \quad (7\text{-a})$$

$$\omega_d 2 = \omega_0 2 \quad (7\text{-b})$$

Figure 11A:
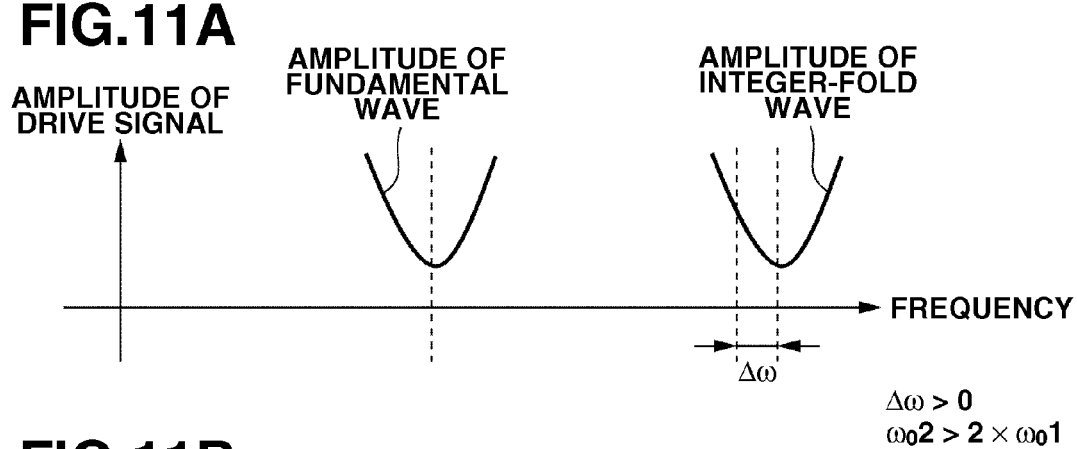
FIG. 11A is a graph showing the driving frequency-amplitude characteristic of a system with two movable bodies in a case of $\Delta\omega>0$.
Figure 11B:
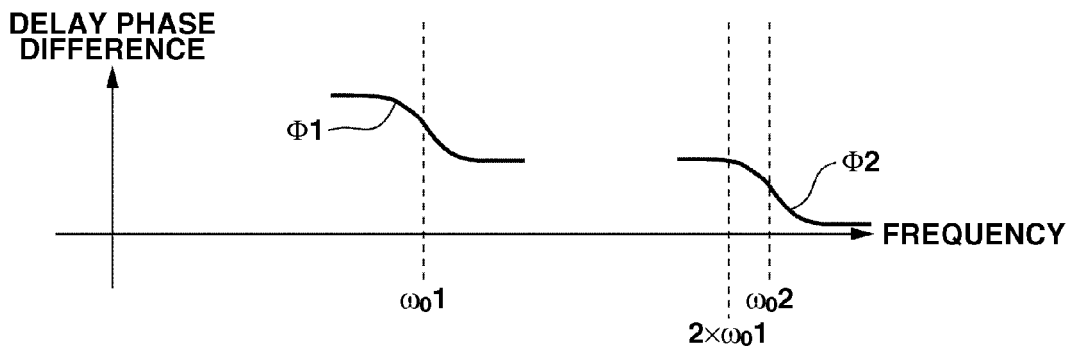
FIG. 11B is a graph showing the driving frequency-delay phase characteristic of the system with two movable bodies in a case of $\Delta\omega>0$.

FIGS. 11A and 11B show the drive signal amplitude-frequency characteristic and the phase difference-frequency characteristic in a device with $\Delta \omega > 0$. Here, when the driving frequency of the fundamental wave component in the drive signal is caused to coincide with the fundamental resonance frequency, the driving frequency $\omega_d 1$ of the fundamental wave component in the drive signal and the driving frequency $\omega_d 2$ of the integer-fold wave component in the drive signal are represented by equations (8-a) and (8-b).

$$\omega_d 1 = \omega_0 1 \quad (8\text{-}a)$$

$$\omega_d 2 = 2 \times \omega_0 1 = \omega_0 2 - \Delta\omega \quad (8\text{-}b)$$

Then, the delay phase difference between the integer-fold driving wave phase and the vibration phase becomes smaller than when the driving frequency $\omega_d 2$ is set at the resonance frequency $\omega_0 2$. Further, the changing rate of the delay phase difference $\phi 1$ on the side of the fundamental frequency is larger. Therefore, when the driving frequencies are changed by causing the driving frequency of the fundamental wave component in the drive signal to coincide with the fundamental resonance frequency as shown in formulae (8-a) and (8-b), the precision becomes higher when two driving frequencies are changed with the delay phase difference value $\phi 1$ on the side of the fundamental frequency being the target delay phase difference.

Conversely, when the following equations (9-a) and (9-b) are established, the delay phase difference between the integer-fold driving wave phase and the vibration phase becomes larger than when the driving is performed by setting the driving frequency $\omega_d 1$ of the fundamental wave component at the resonance frequency $\omega_0 1$.

$$\omega_d 1 = \omega_0 2/2 = \omega_0 1 + (\Delta\omega/2) \quad (9\text{-}a)$$

$$\omega_d 2 = \omega_0 2 \quad (9\text{-}b)$$

Further, the changing rate of the delay phase difference $\omega 2$ on the side of the integer-fold frequency is larger. Therefore, in a case where the driving frequencies are changed by causing the driving frequency of the integer-fold wave component in the drive signal to coincide with the resonance frequency of the integer-fold wave as shown in formulae (9-a) and (9-b), the precision becomes higher when two driving frequencies are changed with the delay phase difference value $\phi 2$ on the side of the integer-fold frequency being the target delay phase difference.

Further, when the driving is performed with the driving frequencies being in a range between two resonance frequencies, a way of changing two driving frequencies with the delay phase difference value $\phi 1$ or $\phi 2$ being the target delay phase difference can be determined based on the fact that to which of the fundamental and integer-fold resonance frequencies the driving frequencies are closer.

Figure 12A:
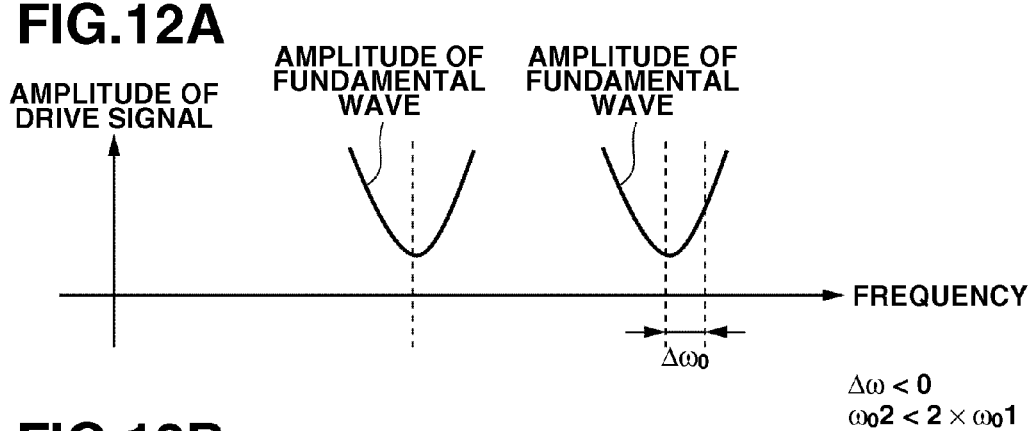
FIG. 12A is a graph showing the driving frequency-amplitude characteristic of a system with two movable bodies in a case of $\Delta\omega<0$.
Figure 12B:
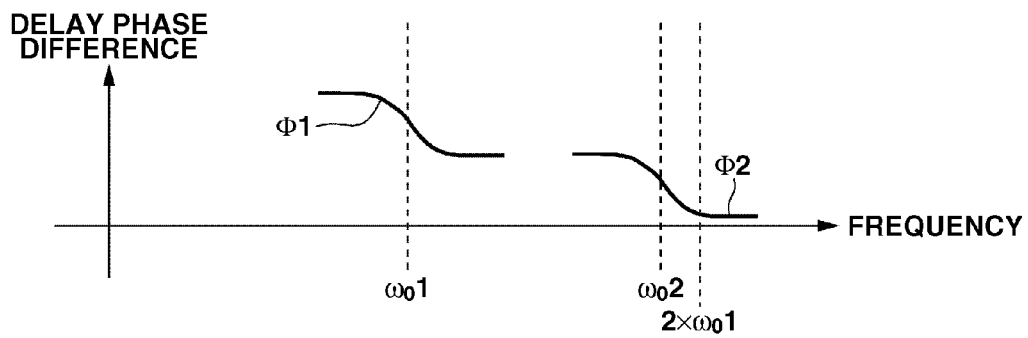
FIG. 12B is a graph showing the driving frequency-delay phase characteristic of the system with two movable bodies in a case of $\Delta\omega<0$.

FIGS. 12A and 12B show the drive signal amplitude-frequency characteristic and the phase difference-frequency characteristic in a device with $\Delta\omega<0$, respectively. Also in this case, similar to the case of $\Delta\omega>0$, which of the delay phase difference values $\phi 1$ and $\phi 2$ should be the target delay phase difference can be determined based on the fact that with which of the fundamental and integer-fold resonance frequencies $\omega_0 1$ and $\omega_0 2$ the driving frequency is caused to coincide.

Figure 14:
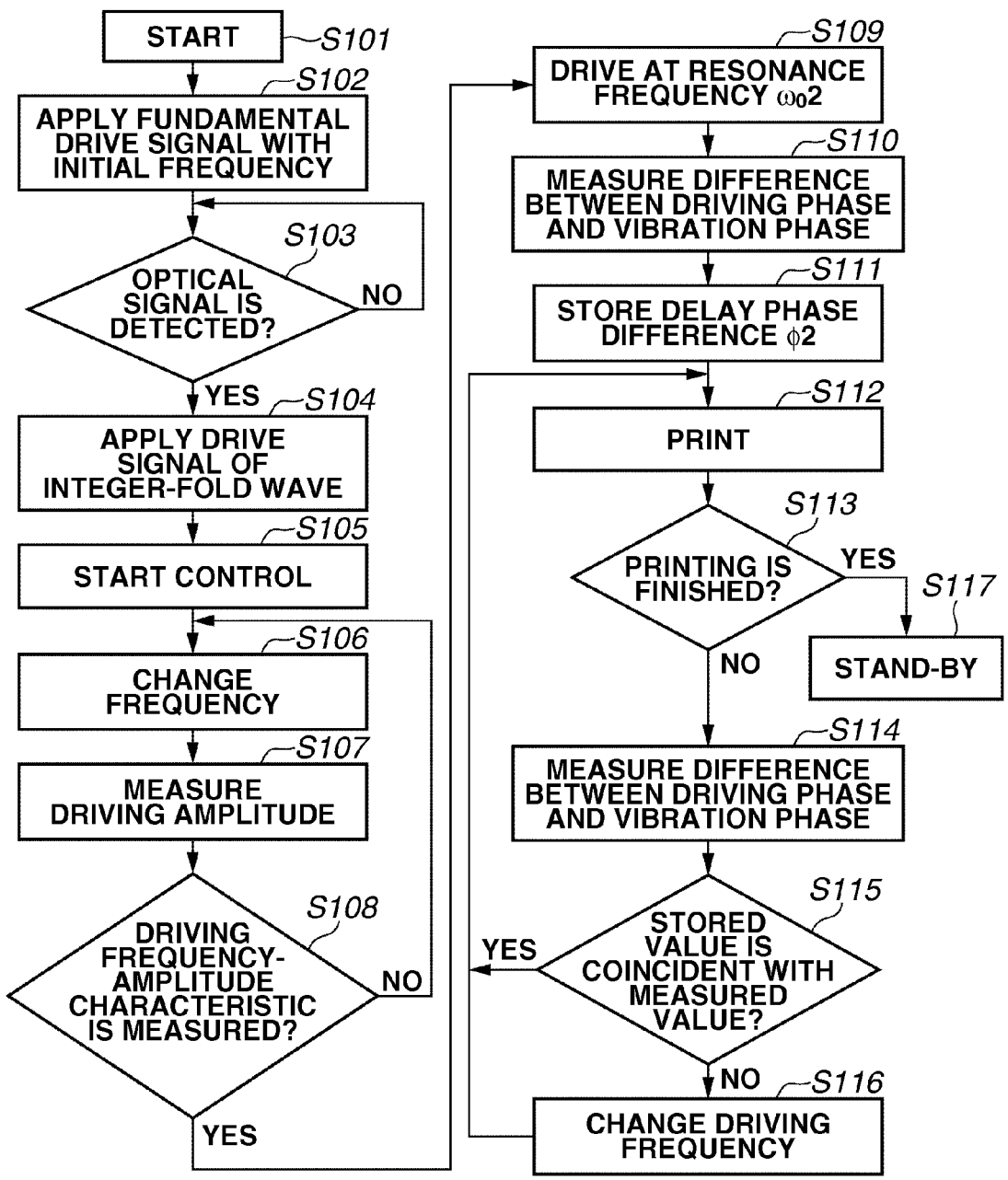
FIG. 14 is a flow chart of a first exemplary embodiment as illustrated in FIG. 1.

Based on the above description of the construction and function, a specific frequency following manner will be described with reference to the flow chart of FIG. 14. The description will be made of an example in which the movable body apparatus is used in an image forming apparatus described below.

Initially, an electrical power source of the image forming apparatus is turned on (S101). The controller 100 sets the starting driving frequency in the signal generator 20, and sets the initial drive amplitude A1 in the integrator 40 to execute the driving by the drive signal including the fundamental wave (S102). As the starting driving frequency, an average value of resonance frequencies or the resonance frequency at the time of the last driving stop is used, for example. An initial value large enough to direct the scanning light beam 233 to the light receiving devices 240 and 260 is used as A1.

Upon application of the drive signal to the driving portion 220, the movable body 201 is vibrated. The vibration is continued until the vibration amplitude of the movable body 201 increases and the signal enters the light receiving devices 240 and 260 (S103).

Then, the drive signal including the integer-fold wave component is applied (S104). The controller 100 sets the vibration amplitude A2 of the initial integer-fold wave component and the initial phase difference $\phi d$ in the integrator 40 (see FIG. 19). After the integer-fold wave is applied, the controller 100 starts such a control that a desired angular displacement is obtained (S105). This control is executed by the calculation using the above matrix. When the angular displacement of the movable body is converged to the desired angular displacement under such control, one of the driving frequencies is swept near a predicted resonance frequency. Thus, two driving frequencies are changed with the relationship of 1:2 being maintained (S106). The drive amplitude at that time is measured (S107). Until the measurement of the driving frequency-amplitude characteristic is completed, changing of the driving frequencies and measurement of the drive amplitude are repeated (S108). Such operation is performed for the driving frequency corresponding to each of the two resonance frequencies.

Then, the driving frequency is determined based on the thus-measured driving frequency-amplitude characteristic (S109). Here, description will be made of a case where the driving frequency $\omega_d 2$ is caused to coincide with the resonance frequency $\omega_0 2$ of the integer-fold wave mode. In the driving at the driving frequency, the delay phase difference $\phi 2$ between the integer-fold driving wave phase and the vibration phase is measured (S110) The delay phase difference is stored in the storing portion 102 of the controller 100 as the target delay phase difference (S111). As described above, it is also possible to perform the driving in which the driving frequency $\omega_d 1$ is caused to coincide with the fundamental resonance frequency $\omega_0 1$, or the driving in which driving frequencies are set in a range between two resonance frequencies.

After completion of the above preparation, actual printing is started (S112). After the start, judgment if the printing is continued or finished is executed (S113). When the printing (driving) is to be continued, the delay phase difference $\phi 2$ between the integer-fold driving wave phase and the vibration phase during the driving is measured (S114). The measured phase difference is compared with data (the target delay phase difference) stored in the storing portion 102 (S115). Based on the comparison result, printing is continued when no difference is present. When the difference exists, two driving frequencies are changed with the relationship of 1:2 being maintained so that the measured delay phase difference $\phi 2$ is caused to be approximately coincident with the target delay phase difference stored in the storing portion 102 (S116). Further, when the printing is required to be finished in the conditional step (S113), the printing is finished and the standby is started (S117).

The above printing process in the image forming apparatus will be described with reference to FIGS. 13A and 13B.

Upon request of the printing process, the optical deflector with the vibratory system 200 is brought into a steady drive condition through the above steps, and emits the scanning light beam 233. The scanning light beam 233 is scanned along a longitudinal axis of a photosensitive body drum 1302 that is the irradiation target object.

Figure 13A:
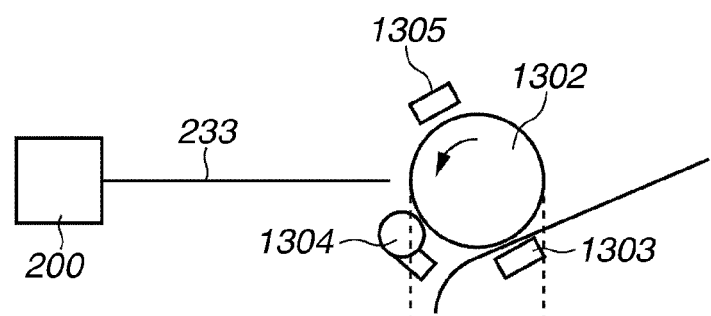
FIG. 13A is a side view illustrating an image forming apparatus using a movable body apparatus as an optical deflector.
Figure 13B:
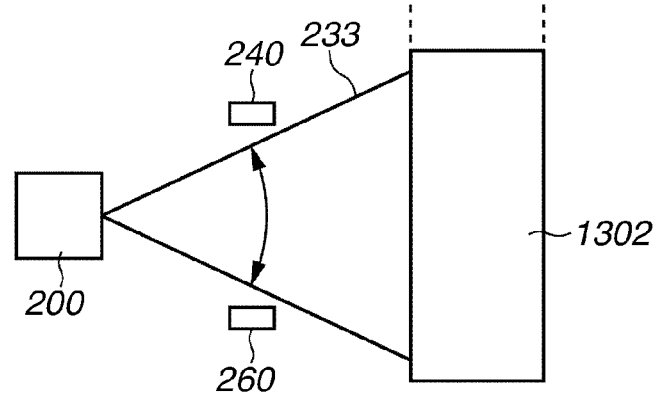
FIG. 13B is a plan view illustrating the image forming apparatus in FIG. 13A.

The photosensitive body drum 1302 starts to be rotated in a direction of an arrow shown in FIG. 13A, and is charged at a high electrical potential by a charging device 1305. The charged portion reaches the scan line of the scanning light beam 233 as the drum 1302 rotates. ON and OFF of the light source 231 (see FIG. 1) are repeated in such a manner that the scanning light beam 233 is applied to each desired position. The electrical potential of the portion irradiated with the scanning light beam 233 emitted from the light source 231 and deflected by the optical deflector is lowered. Thus, an electrostatic latent image is produced. A developing device 1304 develops the portion of the electrostatic latent image by using magnetic toner including a positive-charged black constituent, for example. The developed toner is transferred to a paper by a transfer member 1303, for example. Thus, the printing process is completed.

In this exemplary embodiment, the delay phase difference measured during the driving is caused to be approximately coincident with the target delay phase difference. Accordingly, even in a vibratory system with plural movable bodies, the driving frequency for achieving an efficient driving can be determined. Thus, even when the resonance frequency changes due to a change in the ambient condition such as temperature, the vibratory system can be always driven efficiently in response to the above change.

A second exemplary embodiment will be described. In the second exemplary embodiment, the condition for changing the driving frequency is different from that in the first exemplary embodiment. In the first exemplary embodiment, the driving frequency is changed if even a slight difference exists between the delay phase difference measured during the driving and data of the target delay phase difference stored in the storing portion 102. In contrast, in the second exemplary embodiment, the driving frequency is changed only when the difference reaches a predetermined threshold or more.

Figure 15:
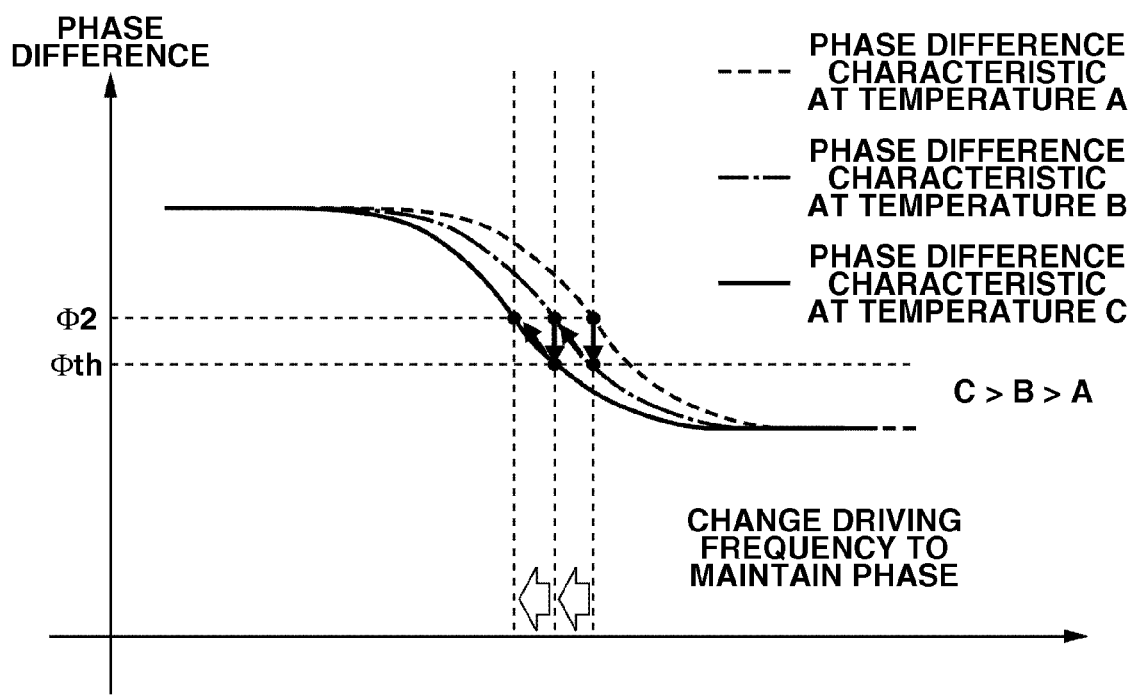
FIG. 15 is a graph showing a manner of changing the driving frequency in a second exemplary embodiment using a threshold.

In the second exemplary embodiment, the predetermined threshold is stored in a storing portion 103 of the controller 100. In a conditional step (S115) in FIG. 14, the controller 100 judges if the difference between the delay phase difference measured during the driving and the target delay phase difference is above the threshold φth or more. If so, the driving frequency is changed, and if not, the printing is continued. FIG. 15 shows changes in the driving frequency-phase characteristic and the driving frequency in the second exemplary embodiment. In this embodiment, the frequency of changing the driving frequency is reduced. Accordingly, burden on the controlling portion is alleviated. As for the other, the second exemplary embodiment is the same as the first exemplary embodiment.

Figure 16A:
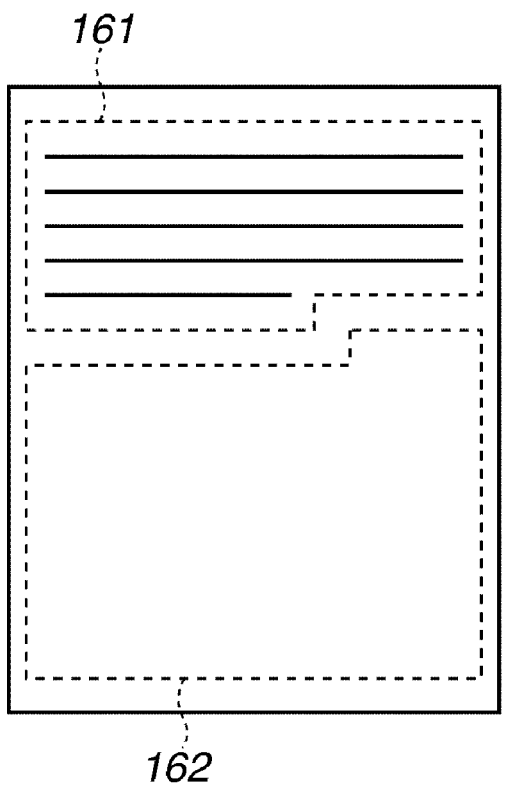
FIG. 16A is a view illustrating image and non-image describing regions in a third exemplary embodiment.
Figure 16B:
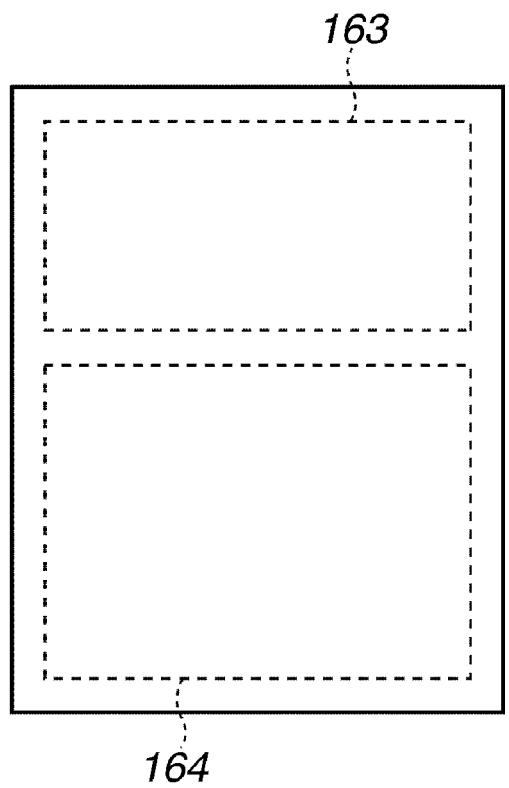
FIG. 16B is a view illustrating image and non-image describing regions in the third exemplary embodiment.

A third exemplary embodiment will be described. In the third exemplary embodiment, limitation is made to the changing timing of the driving frequency in the step (S116) in the first exemplary embodiment. In the image forming apparatus, there are image describing regions 161 and 164 and non-image describing region 162 and 163 as illustrated in FIGS. 16A and 16B, for example. If the driving frequency is changed when the scanning light beam is present on the image describing region, there is a possibility of appearing adverse influences on the quality of an image formed with the scanning light beam. It is often desirable to change the driving frequency while the scanning light beam is present on the non-image describing region.

Figure 17:
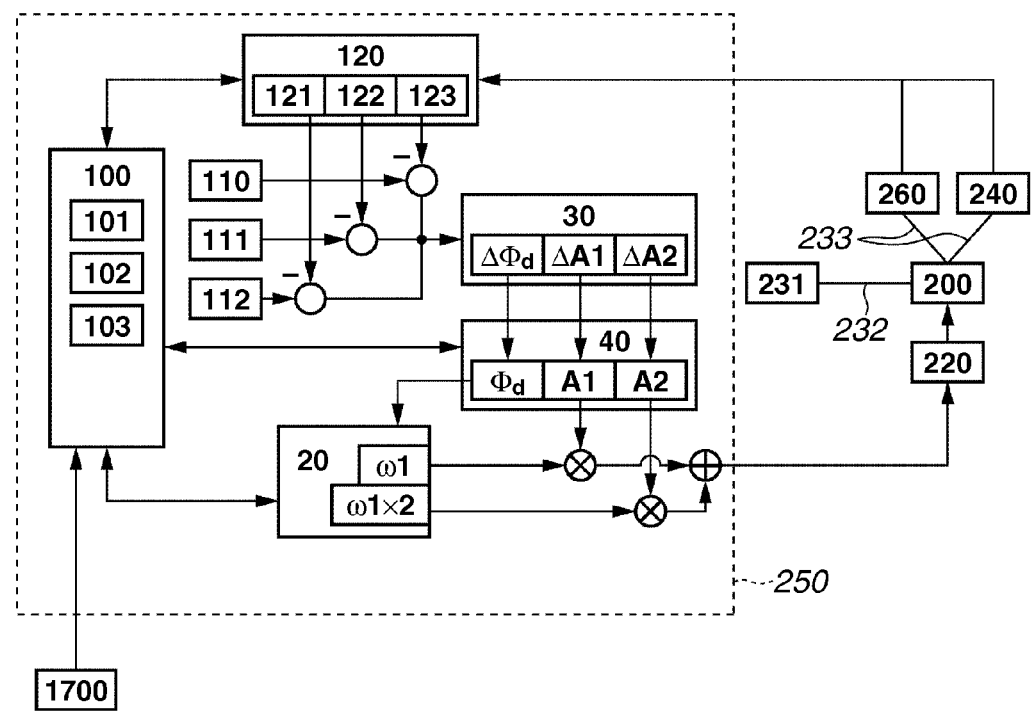
FIG. 17 is a block diagram illustrating a controlling portion of the third exemplary embodiment.
Figure 18:
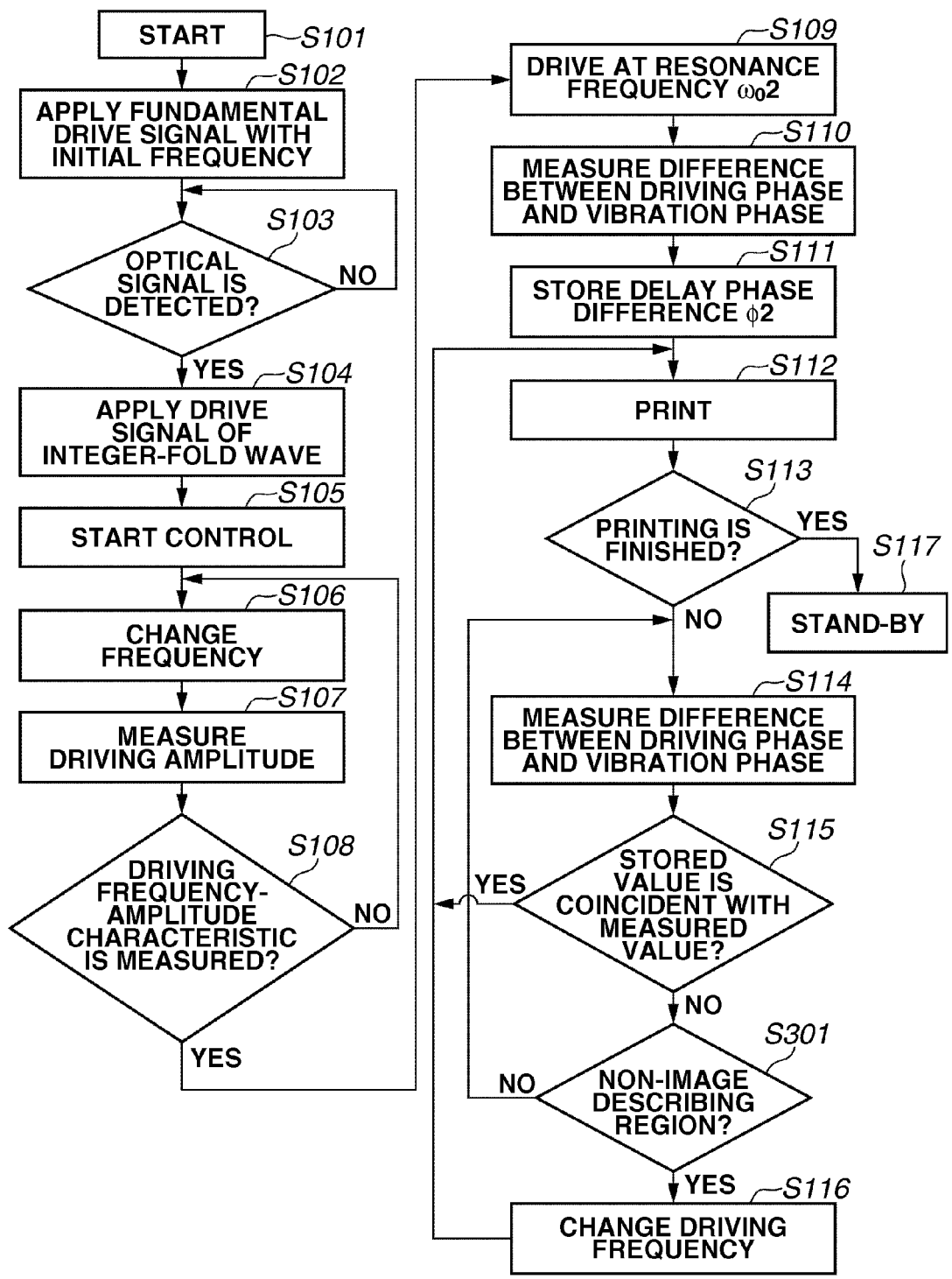
FIG. 18 is a flow chart of the third exemplary embodiment in FIG. 17.

In the third exemplary embodiment, the controlling portion 250 recognizes the non-image describing region by acquiring image information from an image memory 1700 illustrated in FIG. 17. FIG. 18 shows a flow chart of the third exemplary embodiment. This flow chart is different from the flow chart of FIG. 14 in that if the scanning light beam is present on the non-image describing region or not is judged (S301) when a change in the driving frequency is needed. When the scanning light beam is present on the image describing region, a present delay phase difference between the drive phase and the vibration phase is again measured. Based on the result of repeated measurement, when a necessity of changing the driving frequency still exists and the scanning light beam is present on the non-image describing region of the irradiation target object, the driving frequency is changed (S116). As for the other, the third exemplary embodiment is the same as the first exemplary embodiment.

Figure 20:
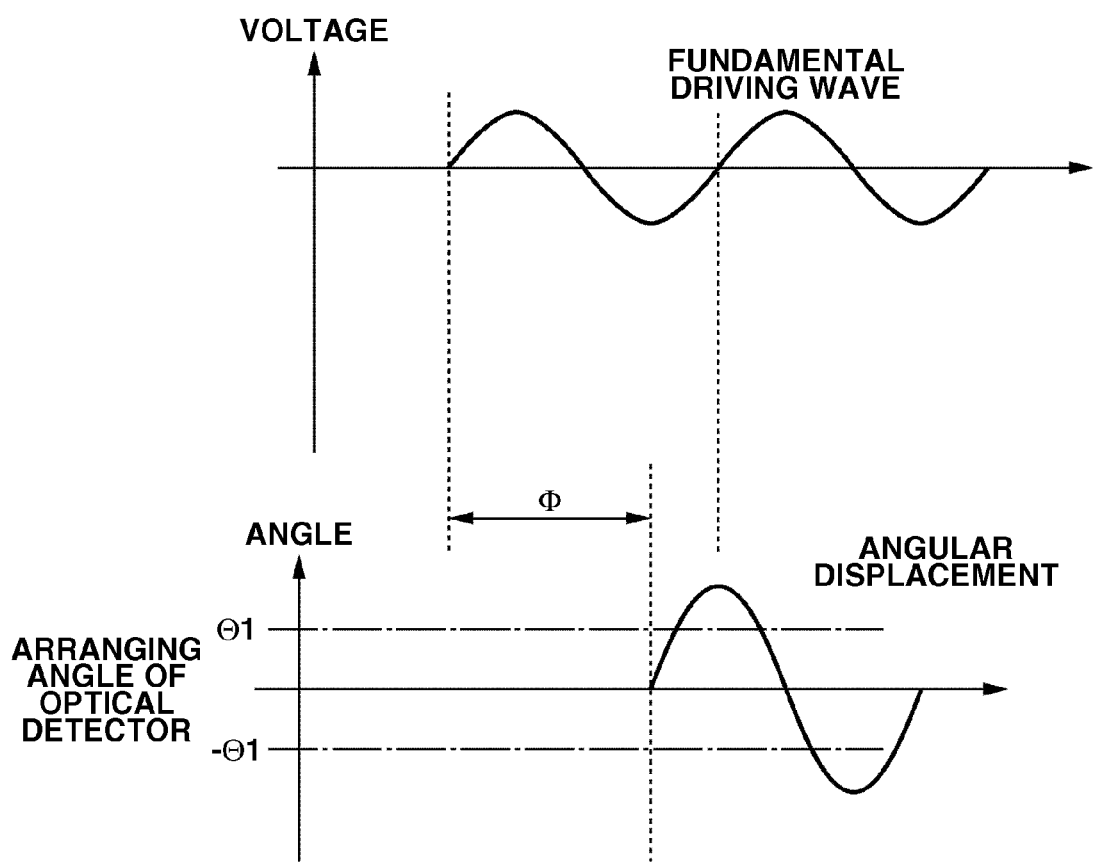
FIG. 20 is a graph showing the relationship between waveforms of drive signal and angular displacement in a fourth exemplary embodiment of a movable body apparatus with a single movable body.

A fourth exemplary embodiment will be described. In the fourth exemplary embodiment, a vibratory system includes a single movable body. FIG. 20 shows the relationship between the drive signal and the angular displacement. Each of the drive signal and the angular displacement has a single frequency component only. The phase difference between the drive phase and the vibration phase is φ.

Figure 21:
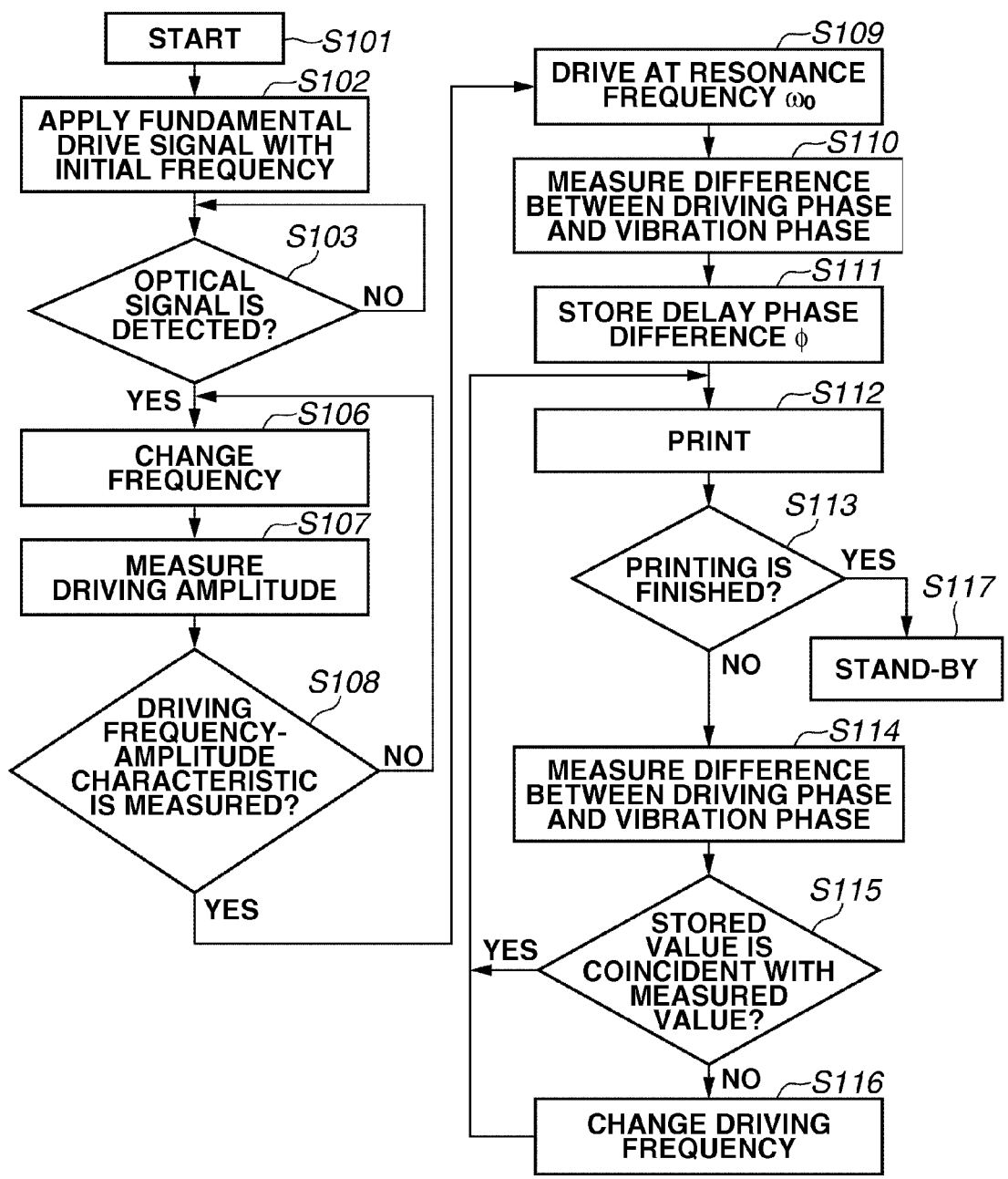
FIG. 21 is a flow chart of the fourth exemplary embodiment in FIG. 20.
Figure 22:
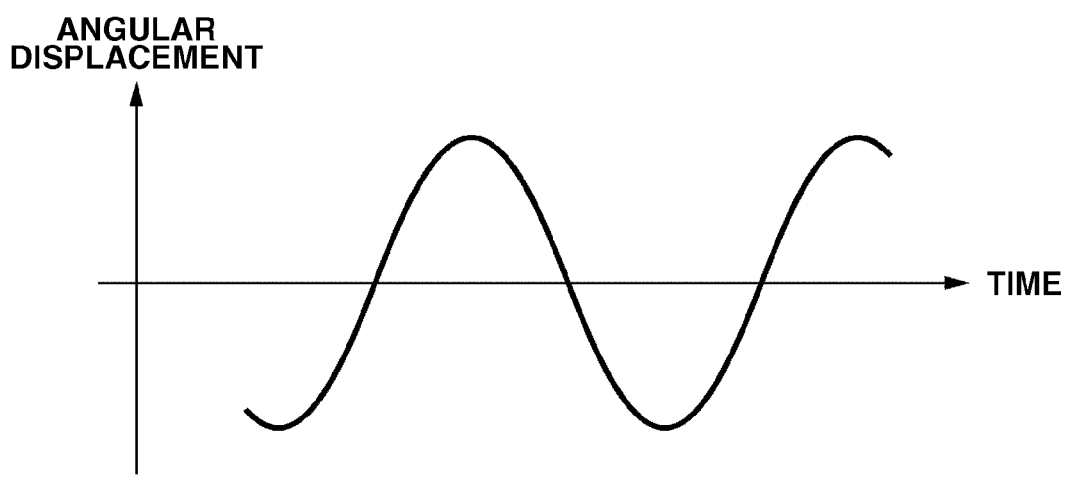
FIG. 22 is a graph showing a saw-tooth wave of the angular displacement of a movable body.

FIG. 21 shows a flow chart of this exemplary embodiment. In the driving using one frequency, there is no need of the application of the drive signal component of the integer-fold wave (see S104 in FIG. 14) and the phase control between two frequency components in the angular displacement (see S105 in FIG. 14). These steps are necessary in the system including two vibrators. Therefore, respective portions in the controlling portion can be simplified in the fourth exemplary embodiment. As illustrated in the flow chart of FIG. 21, the operation principle of this exemplary embodiment is the same as that of the first exemplary embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-97394, filed Apr. 3, 2008, and 2009-50013, filed Mar. 4, 2009, which are incorporated by reference herein in their entirety.

What is claimed is:

1. A movable body apparatus comprising:
    a vibratory system having a resonance frequency and a movable body capable of being reciprocally and rotatably vibrated;
    a vibration detecting portion configured to detect a vibration condition of the movable body;
    a driving portion configured to drive the vibratory system with a drive signal; and
    a controlling portion configured to regulate the drive signal supplied to the driving portion,
    wherein the controlling portion stores, as a target delay phase difference, a delay phase difference between a drive phase of the drive signal and a vibration phase of the vibratory system obtained from a detection result of the vibration detecting portion, both the drive phase and the vibration phase being obtained at the time when the vibratory system is vibrated at a predetermined frequency, and
    wherein the controlling portion regulates a driving frequency of the drive signal so that the delay phase difference between the drive phase of the drive signal and the vibration phase of the vibratory system obtained from detection result of the vibration detecting portion, both measured during driving of the vibratory system, is caused to be approximately coincident with the target delay phase difference.

2. A movable body apparatus according to claim 1, wherein the controlling portion measures a relationship between a frequency of a signal component of the drive signal corresponding to a frequency component involved in the vibration of the movable body and an amplitude of the frequency component, and determines the predetermined frequency based on the measurement result.

3. A movable body apparatus according to claim 1, wherein the vibratory system includes a first movable body and a second movable body that are reciprocally and rotatably supported, the vibratory system having a fundamental resonance frequency and an integer-fold wave resonance frequency in which a relationship therebetween is an approximately integer ratio, wherein the vibration detecting portion detects the vibration condition of the first movable body, wherein the driving portion drives the vibratory system with the drive signal in the form of a combined wave of a fundamental wave signal component with a fundamental frequency at or close to the fundamental resonance frequency, and an integer-fold wave signal component with an integer-fold wave frequency of the fundamental frequency, and wherein the target delay phase difference is a delay phase difference between the drive phase of one of the fundamental wave signal component and the integer-fold wave signal component and the vibration phase of the first movable body.

4. A movable body apparatus according to claim 3, wherein the target delay phase difference is a delay phase difference between the drive phase of a signal component out of the fundamental wave signal component and the integer-fold wave signal component, whose frequency is closer to the resonance frequency, and the vibration phase of the first movable body.

5. A movable body apparatus according to claim 3, wherein the controlling portion regulates a phase difference between the fundamental wave signal component and the integer-fold wave signal component so that a phase difference between plural frequency components involved in the vibration of the first movable body reaches a predetermined value, wherein the controlling portion changes two frequencies with the integer ratio between the two frequencies of the fundamental wave signal component and the integer-fold wave signal component being maintained, wherein the controlling portion measures a relationship between a frequency of a signal component of the drive signal corresponding to a frequency component involved in the vibration of the first movable body and an amplitude of the frequency component, and determines the predetermined frequency based on the measurement result, wherein the controlling portion detects the target delay phase difference at the time when the first movable body is driven at the predetermined frequency, and stores the detected result in a storing portion, and wherein the controlling portion regulates the driving frequency of the drive signal so that the delay phase difference measured during driving of the vibratory system is caused to be approximately coincident with the target delay phase difference.

6. A movable body apparatus according to claim 5, wherein the predetermined value of the phase difference between the plural frequency components involved in the vibration of the first movable body is zero.

7. A movable body apparatus according to claim 1, wherein the controlling portion changes the driving frequency of the drive signal when a difference between the target delay phase difference and the delay phase difference measured during driving of the vibratory system becomes above a predetermined threshold.

8. An optical deflector comprising:
the movable body apparatus according to claim 1; and
a reflective mirror provided on the movable body to reflect and deflect a light beam from a light source,
wherein the vibration detecting portion includes a light receiving device arranged to detect the deflected light beam at a predetermined deflection angle, and the vibration condition of the movable body is detected based on a time interval of light beam detection by the light receiving device.

9. An optical instrument comprising:
the optical deflector according to claim 8; and
an irradiation target object,
wherein the optical deflector deflects the light beam from the light source, and directs at least a portion of the light beam to the irradiation target object.

10. An optical instrument according to claim 9, wherein the controlling portion regulates the driving frequency of the drive signal when the light beam is incident on a non-image describing region of the irradiation target object.

* * * * *